United States Patent [19]

Wagener et al.

[11] 4,447,333

[45] May 8, 1984

[54] PROCESS FOR THE ELIMINATION OF AMMONIA IN COKE PLANT WASTE WATERS

[75] Inventors: Dietrich Wagener; Theo Sander, both of Essen; Karl H. Laue, Hattingen, all of Fed. Rep. of Germany

[73] Assignee: Didier Engineering GmbH., Fed. Rep. of Germany

[21] Appl. No.: 457,444

[22] Filed: Jan. 12, 1983

Related U.S. Application Data

[63] Continuation of Ser. No. 188,827, Sep. 19, 1980, abandoned.

[30] Foreign Application Priority Data

Sep. 25, 1979 [DE] Fed. Rep. of Germany ....... 2938654

[51] Int. Cl.$^3$ .......................... C02F 1/20; C02F 1/70; C02F 1/72
[52] U.S. Cl. .................. 210/750; 210/757; 210/763; 210/903; 210/919; 423/237; 423/239
[58] Field of Search ............... 210/750, 757, 762, 763, 210/903, 919; 423/237, 239 A

[56] References Cited

U.S. PATENT DOCUMENTS

| | | | |
|---|---|---|---|
| 1,428,618 | 9/1922 | Wagner | 210/757 |
| 3,970,739 | 7/1976 | Shiraishi et al. | 423/239 A |
| 4,160,725 | 7/1979 | Josis et al. | 210/750 |
| 4,272,497 | 6/1981 | Takahashi et al. | 423/239 A |
| 4,273,749 | 6/1981 | Kimura et al. | 423/237 |
| 4,294,706 | 10/1981 | Kakihara et al. | 210/903 |

FOREIGN PATENT DOCUMENTS

| | | | |
|---|---|---|---|
| 49-118691 | 11/1974 | Japan | 423/237 |
| 50-53271 | 5/1975 | Japan | 423/237 |
| 54-110969 | 8/1979 | Japan | 423/239 A |
| 659533 | 4/1979 | U.S.S.R. | 210/763 |

OTHER PUBLICATIONS

"The DHG Process—An NO$_x$ Reduction Process for Waste Gases".
"Das DHG-Verfahren-ein NO$_x$-Reduzierungsverfahren fur Abgase", Umwelt, 5/80.

Primary Examiner—Peter A. Hruskoci
Attorney, Agent, or Firm—Wood, Herron & Evans

[57] ABSTRACT

A process for the elimination of ammonia in waste waters from a coke oven battery wherein ammonia-containing waste water or ammonia-containing vapor obtained by means of ammonia separation from the waste water are mixed with flue gas from the coke oven battery and sprayed into a NO$_x$ reactor at an elevated temperature with the resulting mixture being subjected to a catalytic redox reaction.

5 Claims, 2 Drawing Figures

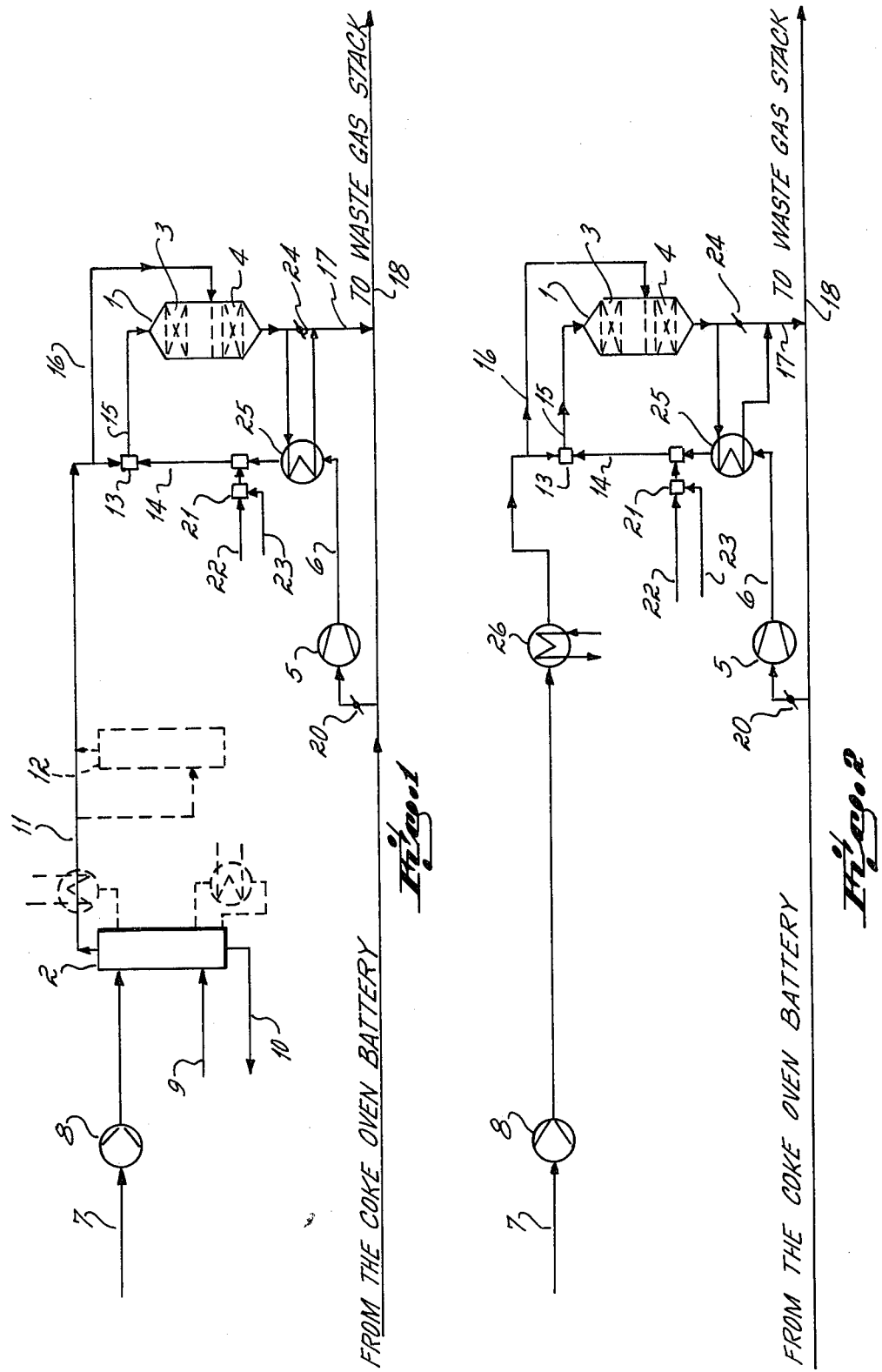

PROCESS FOR THE ELIMINATION OF AMMONIA IN COKE PLANT WASTE WATERS

This is a continuation, of application Ser. No. 188,827, filed Sept. 19, 1980 now abandoned.

BACKGROUND OF THE INVENTION

This invention relates to a process fo the elimination of ammonia in waste waters and, more particularly, to the elimination of ammonia in waste waters in a coking plant.

Ammonia produced at a coking plant today can no longer be profitably recovered. Accordingly, it is necessary to have a cost-effective process for the elimination of ammonia at coking plants. Known processes such as burning an ammonia-containing gas stream have a number of problems including corrosion of equipment, high temperatures, and the production of waste gases containing nitrogen oxides. The problem underlying this invention is to provide a cost-effective process for the removal of ammonia from waste waters, especially from coking plant water, which causes minimal pollution to the environment.

SUMMARY OF THE INVENTION

This problem is solved in accordance with the invention by spraying into a $NO_x$ reactor at elevated temperature the ammonia-containing waste water with flue gas from the coke oven battery wherein the resulting mixture is subjected to a catalytic redox reaction. The ammonia-containing waste water may be either sprayed directly into the reactor or first passed through an ammonia separator to provide an ammonia-containing gas stream which is then sprayed into the $NO_x$ reactor.

The process of this invention provides not only for the removal of ammonia from the coke oven crude gas in a simple and efficient manner, but also provides a considerable reduction in the $NO_x$ content of the coke oven flue gases to the extent necessary for the elimination of the ammonia. The oxidation/reduction reaction of ammonia in accordance with this invention takes place at comparatively low temperatures. Due to the exothermic nature of the reaction, however, additional usable heat can be obtained by means of a heat exchanger. Surprisingly, the ammonia decomposition with $NO_x$ is not adversely influenced by other substances contained in the ammonia-containing waste waters and/or vapors such as carbon dioxide, hydrogen sulfide, and hydrogen cyanide.

When the flue gas has a relatively high $NO_x$ content, especially in older coke oven batteries, only small amounts of flue gas are required for the decomposition of the ammonia. With more modern coke oven batteries, especially those employing lean gas heating, the flue gas has a lower $NO_x$ content and temperatures between 200° and 250° C.; and, accordingly, greater amounts of flue gas must be employed for the decomposition reaction, thereby enabling a greater waste water and/or vapor charge without falling below the due point of the waste gases. Since in older coke oven batteries the $NO_x$ reactor must take smaller waste water and/or water vapor charges, in order to avoid dropping below the due point in the waste gas flue, it is desirable to use the process alternative of injecting ammonia vapors rather than ammonia-containing waste water into the reactor. However, in newer coke oven batteries using flue gases of higher temperature, the ammonia containing waste water can be sprayed directly into the $NO_x$ reactor. The investment in an ammonia separator is thereby unnecessary in newer coke oven batteries. Among the other advantages of the present invention are that the separated waste water does not accrue in the coke oven plant eliminating the need for cooling and routing of the waste water to some other waste water treatment; there is no vapor condensate lost through the waste water; and the heat supply to the process is not lost through the vapor.

The process of this invention provides a simple and dependable way to eliminate ammonia in coking plants in spite of a number of variables found in coking plant operation. These variables include various amounts of ammonia accruing in the coking plant, variations in the amount of $NO_x$ depending on the age of the coke oven batteries, i.e., rich gas heating generates more $NO_x$ than lean gas heating and older coke oven batteries generate more $NO_x$ than more modern batteries, and variations in the amount of $NO_x$ contained in the flue gas. Moreover, the process is particularly useful in that flue gas from the coke oven batteries present a $NO_x$ supply which is generated continuously with the generation of the ammonia waste water.

The ammonia water accrues in the cooling of coking crude gas. It contains about 40% of the ammonia quantity of the coking plant crude gas. This ammonia water is then cooled further, filtered and used for the further removal of the ammonia from the coking plant crude gas down to an ammonia content of about 2 g/100 $Nm^3$, when it is then either directly sprayed into the $NO_x$ reactor together with the flue gas or routed to the ammonia separator. In the latter case, the ammonia separation step, which may be followed by a deacidification step, produces ammonia vapors with a $NH_3/H_2O$ ratio of about 1:3 to 1:8 and a temperature of about 100° C.

In prior processes for the removal of nitrogen oxides by reaction with ammonia, the ammonia is added in a stoichiometrically greater amount. In a particularly preferred embodiment of this invention, the flue gas is mixed with the ammonia-containing waste water and/or ammonia-containing vapor in a manner such that the $NO_x$ quantity of the flue gas is at a stoichiometric ratio with the ammonia quantity. In this process, it is particularly advantageous that the flue gas and/or ammonia-containing waste water and/or ammonia-containing vapor be heated to a temperature such that the mixture in the $NO_x$ reactor will be approximately 250° C. or greater.

The heating of the flue gas and/or the ammonia-containing waste water can be suitably achieved by the concomitant burning of in-plant gas for instance, rich or lean gas, or through heat exchange with the waste gases of the $NO_x$ reactor.

Since the desired $NO_x$ decomposition proceeds at a relatively low temperature, two catalyst beds are sufficient in the $NO_x$ reactor. Only a portion, preferably about 75%, of the ammonia-containing waste water or ammonia-containing vapor is mixed with the flue gas and introduced into the $NO_x$ reactor ahead of the first catalyst bed, while the remainder of the ammonia-containing waste water or ammonia-containing vapor is introduced into the $NO_x$ reactor ahead of the second catalyst bed. With this procedure, it is sufficient to heat the flue gas only to the extent necessary to raise the temperature of the ammonia gases which are at about 100° C. to the reaction temperature of about 250° C. ahead of the first catalyst bed. The ammonia gases routed to the second catalyst bed are heated by the exothermic heat produced in the $NO_x$ reactor.

In accordance with another feature of the invention, at least a part of the stripping vapor from the ammonia separator can be substituted directly or indirectly by waste gases of the $NO_x$ reactor.

In the application of the process of this invention, the $NO_x$ reactor is incorporated in a flue gas line which is located between the coke oven battery and the coke oven waste gas flue which includes a blower. This permits control of the necessary amount of flue gas. Due to the flue draft, the flue gases have a suction of about −50 mm water. The flue gas blower and the flue gas line must be sufficient to overcome the pressure loss and will return the waste gas back to the flue gas duct. In accordance with the process conditions, the waste gas temperature is approximately 200° C. and thus does not drop below the due point of the gas thereby avoiding corrosion damage to the smoke stack.

Further objects and advantages of the invention will be apparent from the following detailed description taken with the attached drawing.

BRIEF DESCRIPTION OF THE DRAWINGS

FIG. 1 shows schematically a system for the application of the process of this invention including the ammonia separation step.

FIG. 2 shows schematically a system for the application of the invention in which an ammonia-containing waste water is sprayed directly into the $NO_x$ reactor.

DETAILED DESCRIPTION OF THE INVENTION

According to FIG. 1, ammonia-containing waste water at a temperature of about 25° C. proceeds through a line 7 with the aid of a pump 8 into an ammonia separator 2 which is supplied with steam via a supply line 9 and from which waste water is removed by way of drain line 10. The ammonia-containing vapors are withdrawn via a line 11 at about 100° C. Incorporated in the line 11 may be a deacidification apparatus 12. The ammonia-containing vapors have a ratio of $NH_3:H_2O$ of about 1:3 to 1:8. A portion, preferably about 75%, of the ammonia-containing vapors is routed to a mixer 13 and mixed with flue gas from a feed line 14. The mixture from ammonia-containing vapor and flue gas is introduced into an $NO_x$ reactor 1 via a line 15 at a temperature of about 250° C. before the first catalyst bed 3. The remainder of the ammonia-containing vapor is introduced into the $NO_x$ reactor 1 via a line 16 ahead of the second catalyst bed 4. The waste gas of the $NO_x$ reactor 1 is returned in a controlled quantity via a connecting line 17 to the flue gas duct 18 from which the flue gas used in the process was withdrawn. The flue gas proceeds, e.g., at a temperature of 150° to 200° C. and a pressure of −40 to −50 mm of water from the coke furnace battery to the point of a flue gas line 6 which empties into the feed line 14. Provided in the flue gas line 6 is a damper 20 which makes it possible to regulate the amount of flue gas to be reacted with the $NH_3$. Moreover, the flue gas line 6 contains a blower 5 which returns the flue gas from the flue gas duct 18 into the $NO_x$ reactor 1 and the waste gas of the reactor via the connecting line 17 into the flue gas duct 18. To heat the flue gas to the desired temperature of about 250° C. or above, two alternatives are provided. Added gas from a line 22 can be burned in a burner 21 along with combustion air from a line 23, and this flue gas can be added to the flue gas flow in the feed line 41. Alternatively, a waste gas portion of the $NO_x$ reactor controlled with the aid of a damper 24 in the connecting line 17 can be passed through a heat exchanger 25 which connects the flue gas line 6 with the feed line 14. The waste gas in the flue gas duct 18 is routed to the waste gas stack at a temperature of about 180° C. to 200° C. and a pressure of about −45 to −50 mm of water.

The alternative process illustrated in FIG. 2 corresponds extensively with that illustrated in FIG. 1, with the difference that instead of using ammonia-containing gases a portion of the ammonia-containing waste water is mixed with the flue gas before the first catalyst bed 3 of the $NO_x$ reactor 1 and sprayed into it, while the smaller remainder of the ammonia-containing waste water is sprayed into the $NO_x$ reactor 1 only ahead of the second catalyst bed 4. The ammonia-containing waste water can in this connection be heated in a heat exchanger 26, for instance, against the waste gas of the $NO_x$ reactor 1, so that a reaction temperature of about 250° C. or above is obtained.

We claim:

1. A process for concurrently treating an ammonia-containing waste fluid stream and a $NO_x$-containing flue gas from a coking plant comprising:
   separating the waste fluid stream into a major portion and a minor portion;
   combining the major portion of the waste fluid stream with the flue gas to form a mixture containing at least a stoichiometric ration of $NO_x$ to ammonia;
   introducing the mixture into a reactor in the form of a spray or vapor;
   reacting the mixture in a first catalyst bed at a temperature of at least about 250° C. for converting a substantial amount of ammonia in the waste fluid stream and $NO_x$ in the flue gas into a nitrogen and water vapor reaction product, the reaction being exothermic;
   heating the minor portion of the waste fluid stream in the reactor with the heat generated from the reaction of the mixture in the first catalyst bed; and
   reacting in a second catalyst bed the minor portion of the waste fluid stream with the reaction product of the first catalyst bed for converting a further amount of ammonia in the waste fluid stream and $NO_x$ in the flue gas into a nitrogen and water vapor waste gas, and removing said waste gas from said reactor.

2. The process of claim 1 wherein said ammonia-containing fluid stream is ammonia-containing waste water.

3. The process of claim 1 wherein said ammonia-containing fluid stream is an ammonia-containing gas obtained from the separation of ammonia from ammonia-containing waste water.

4. The process of claim 1 wherein said mixture contains an approximate stoichiometric ratio of $NO_x$ to $NH_3$.

5. The process of claim 1 wherein the major portion is an amount of about 75% by volume of the waste fluid.

* * * * *